US007473058B2

(12) United States Patent
Zhu

(10) Patent No.: US 7,473,058 B2
(45) Date of Patent: Jan. 6, 2009

(54) POWER TOOL WITH A CUTTING DEPTH ADJUSTMENT MECHANISM

(75) Inventor: Yongbing Zhu, Nanjing (CN)

(73) Assignee: Chervon Limited, Hong Kong (HK)

( * ) Notice: Subject to any disclaimer, the term of this patent is extended or adjusted under 35 U.S.C. 154(b) by 0 days.

(21) Appl. No.: 11/970,733

(22) Filed: Jan. 8, 2008

(65) Prior Publication Data

US 2008/0193240 A1 Aug. 14, 2008

(30) Foreign Application Priority Data

Feb. 8, 2007 (CN) ..................... 200720034376.X

(51) Int. Cl.
*B23C 1/20* (2006.01)

(52) U.S. Cl. ................... 409/182; 409/210; 144/136.95

(58) Field of Classification Search ......... 409/181-182, 409/175, 185, 210, 214, 218; 144/136.95, 144/154.5; 408/111, 129, 132, 135
See application file for complete search history.

(56) References Cited

U.S. PATENT DOCUMENTS

| | | | | | |
|---|---|---|---|---|---|
| 1,874,232 | A | * | 8/1932 | Groene et al. | 409/182 |
| 2,855,963 | A | * | 10/1958 | Potter | 144/134.1 |
| 4,319,860 | A | * | 3/1982 | Beares | 409/182 |
| 4,445,811 | A | * | 5/1984 | Sanders | 409/182 |
| 5,853,274 | A | * | 12/1998 | Coffey et al. | 409/182 |
| 2003/0007843 | A1 | * | 1/2003 | Cotton et al. | 409/182 |
| 2004/0253068 | A1 | | 12/2004 | Gerhardt et al. | |
| 2006/0102248 | A1 | * | 5/2006 | Cooper et al. | 144/136.95 |
| 2008/0175683 | A1 | * | 7/2008 | Zhu | 409/182 |

* cited by examiner

*Primary Examiner*—Erica E Cadugan
(74) *Attorney, Agent, or Firm*—Greenberg Traurig LLP

(57) ABSTRACT

A power tool having a hollow base member and a motor housing vertically, movably received in the base member. A vertical toothed bar is fixed on an outside wall of the motor housing. A gear shaft is horizontally mounted on the base member and a worm shaft is vertically mounted on the base member. A link gear that engages the toothed bar and a lock gear are both mounted on the gear shaft. The lock gear is axially movable between a first position and a second position and has a tendency to be in the first position. When the lock gear is in the first position, the lock gear engages a worm mounted on the worm shaft and is circumferentially fixed relative to the link gear. When the lock gear is in the second position, the lock gear disengages the worm and is rotatable relative to the link gear.

11 Claims, 4 Drawing Sheets

POWER TOOL WITH A CUTTING DEPTH ADJUSTMENT MECHANISM

BACKGROUND

The subject disclosure relates to a power tool with a cutting depth adjustment mechanism and, more particularly, relates to an improved structure of the cutting depth adjustment mechanism.

Generally, a power tool, such as an electric router, includes a hollow support base and a body on which a bit assembly is disposed. The body is vertically, movably mounted in the base. To adjust the height of the bit assembly relative to a workpiece, a cutting depth adjustment mechanism is disposed between the base and the body.

By way of example, U.S. Pat. No. 5,853,274 discloses an electrical router which comprises: (A) a base assembly which includes an annular base member and a cylindrical base member supported on the annular base member; (B) a cylindrical housing received within the cylindrical base member, wherein the cylindrical housing includes a plurality of vertically aligned first components; and (C) an adjustment mechanism supported on the base assembly, wherein the adjustment mechanism includes a lever and an adjustment device for moving the lever vertically with respect to the base assembly, and the lever has a second component which is movable between a first position and a second position. When at the first position, the second component is selectively engaged with one of the first components to prevent vertical sliding of the housing relative to the lever. When at the second position, the second component is disengaged with the first component so as to permit vertical sliding of the housing relative to the lever. Such an adjustment mechanism as disclosed is complicated in structure and inconvenient for operating.

SUMMARY

The following describes an electric power tool offering a way of fast and precise adjustment of the height of the bit assembly. More particularly, the following describes a power tool having a base assembly and a motor housing that is slidably mounted on the base assembly. A motor and a transmission mechanism is contained in the motor housing and the transmission mechanism connects to an output shaft on which a bit is fixed. A vertical, toothed bar is mounted on one of the base assembly and the motor housing and a gear shaft is horizontally mounted on the other of the base assembly and the motor housing. A first gear is rotatably mounted on the gear shaft is engaged with the toothed bar, a second gear is mounted on the other of the base assembly and the motor housing, and a knob mounted on the other of the base assembly and the motor housing for operably rotating the second gear. The second gear is slidably movable between a first position and a second position wherein, at the first position, the second gear engages the first gear and, at the second position, the second gear disengages the first gear.

Therefore, a fast and precise adjustment is achieved by changing axial position of the second gear. When the second gear is on the second position, it disengages the first gear and the motor housing is thus available to be moved quickly relative to the base assembly. When the second gear is on the first position, it engages the first gear, and rotation of the knob will drive the second gear to rotate thereby to rotate the first gear, such that the toothed bar together with the motor housing is vertically moved, and a precise adjustment is achieved. Accordingly, a power tool is provided with a compact structure and reliable adjustment of the cutting depth.

BRIEF DESCRIPTION OF THE DRAWINGS

The subject power tool with a cutting depth adjustment mechanism will become apparent from the following detailed description illustrated in the accompanying drawings, wherein.

DETAILED DESCRIPTION

Figure 1:
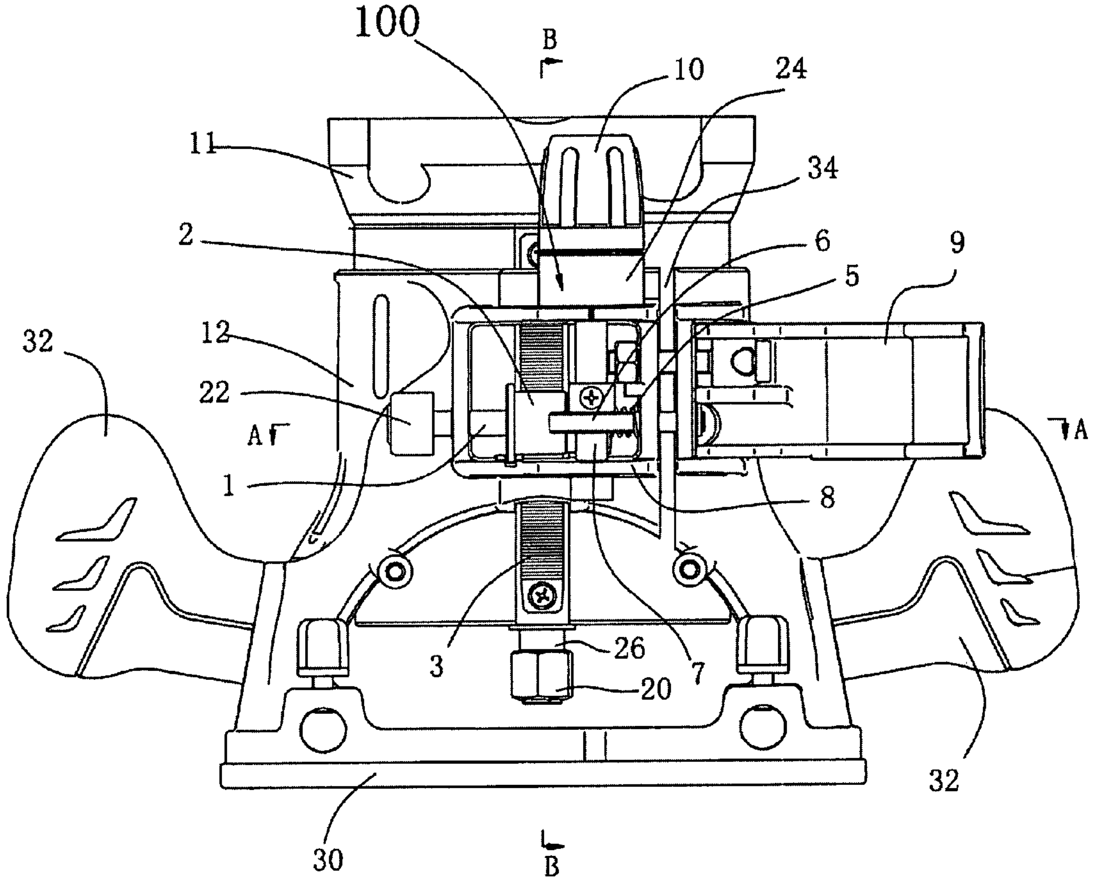
FIG. 1 is a schematic view of an exemplary power tool with a cutting depth adjustment mechanism constructed according to a preferred embodiment of the present invention.
Figure 2:
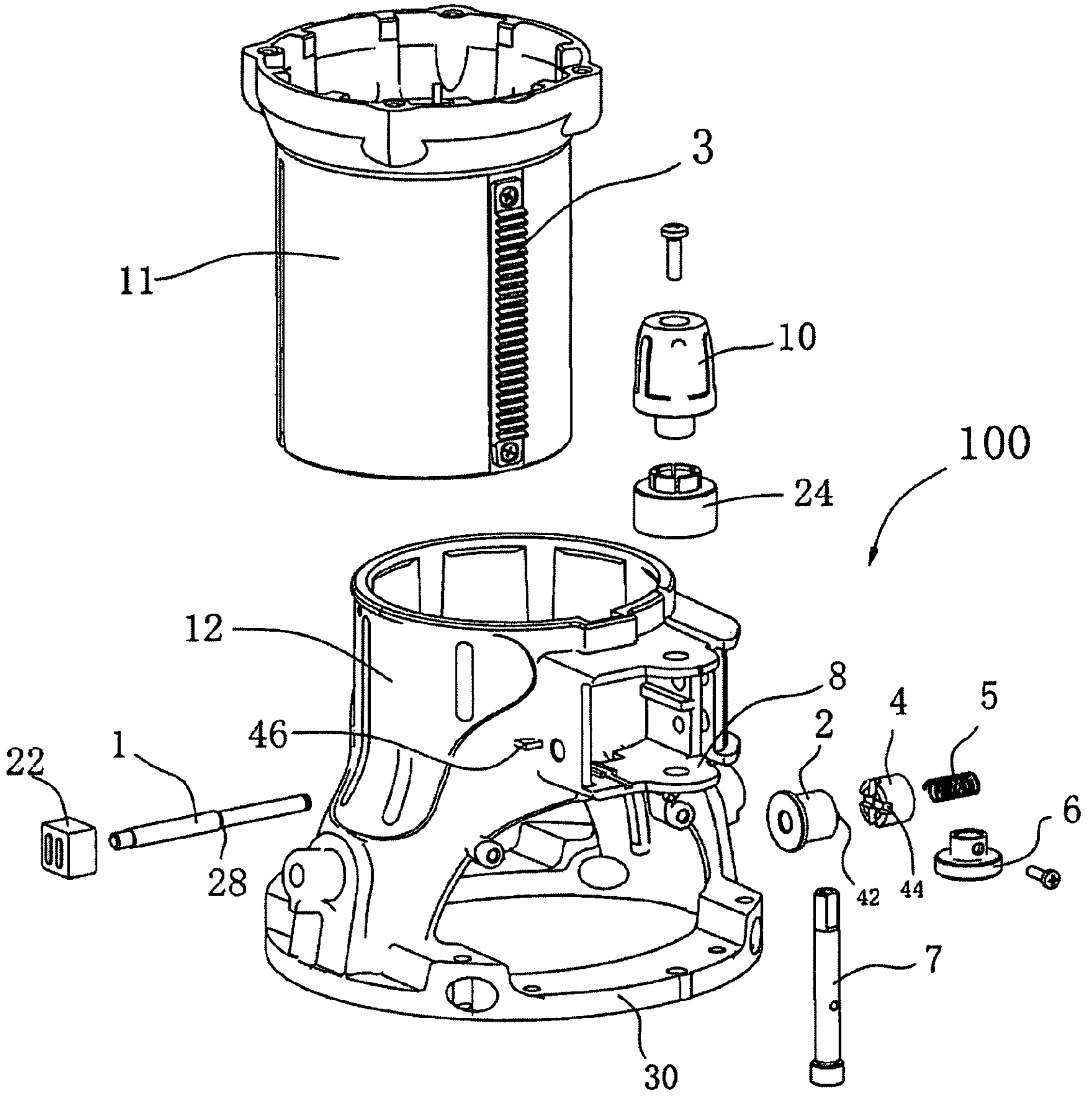
FIG. 2 is an exploded view of FIG. 1.

Referring now to FIG. 1 and FIG. 2, an electric router in accordance with a preferred embodiment of the present invention is shown. The router comprises a base plate 30 and a hollow base member 12 mounted on the base plate 30. A pair of handles 32 is mounted on the base member 12. A motor housing 11 is vertically, movably mounted within the base member 12. A motor and a transmission mechanism (not shown) are contained in the motor housing 11. The transmission mechanism connects to an output shaft 26 to which a bit clamp 20 is mounted for detachably receiving a bit (not shown). A vertical opening slot 34 is formed on the base member 12 such that section of the base member 12 is generally "C" shaped. A first end 36 of a clamping lever 9 is hinged to one side of the opening slot 34 by a hinge shaft 40. The first end 36 of the clamping lever 9 includes a cam surface being available to change the gap of the opening slot 34 as particularly seen in FIG. 3. A second end 38 of the clamping lever 9 can be locked onto a corresponding structure formed on the other side of the opening slot 34 of the base member 12.

Figure 3:
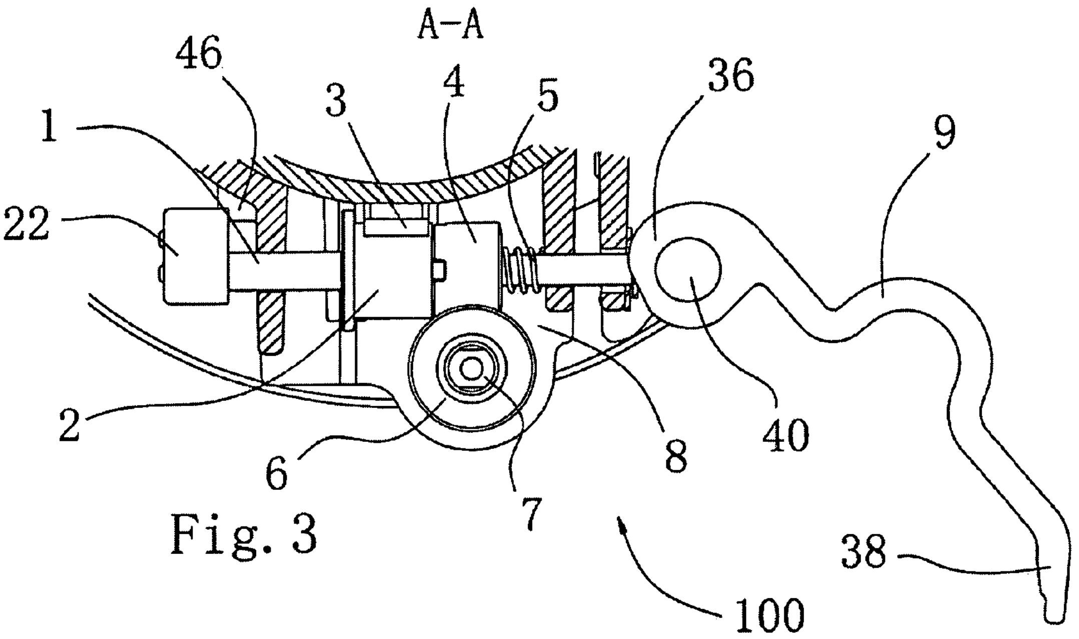
FIG. 3 is a sectional view taken along line A-A of FIG. 1.

Referring to FIG. 3, when the clamping lever 9 is rotated to clamp on the corresponding structure, the gap of the opening slot 34 is reduced and the motor housing 11 is thus clamped by the base member 12. During operation, the base plate 30 is supported on a workpiece, and the bit is driven to rotate to cut the workpiece. To adjust relative height between the bit and the workpiece, it is necessary to adjust the relative height between the motor housing 11 and the base member 12. An adjusting mechanism 100 is available to achieve the adjustment.

Figure 4:
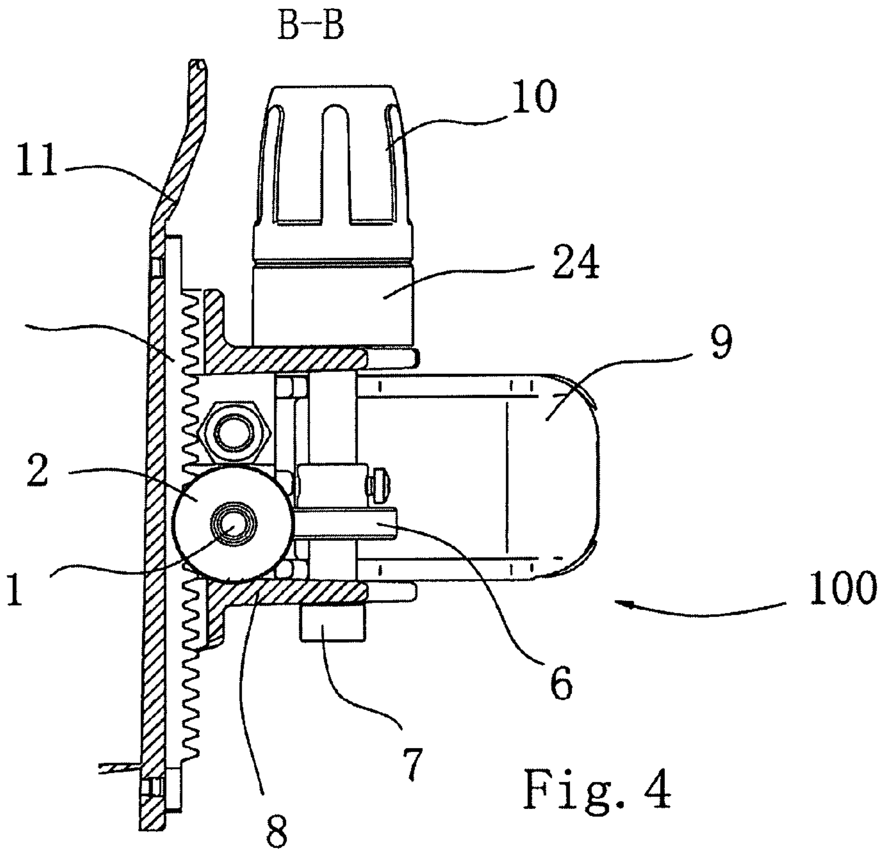
FIG. 4 is a sectional view taken along line B-B of FIG. 1.
Figure 5:
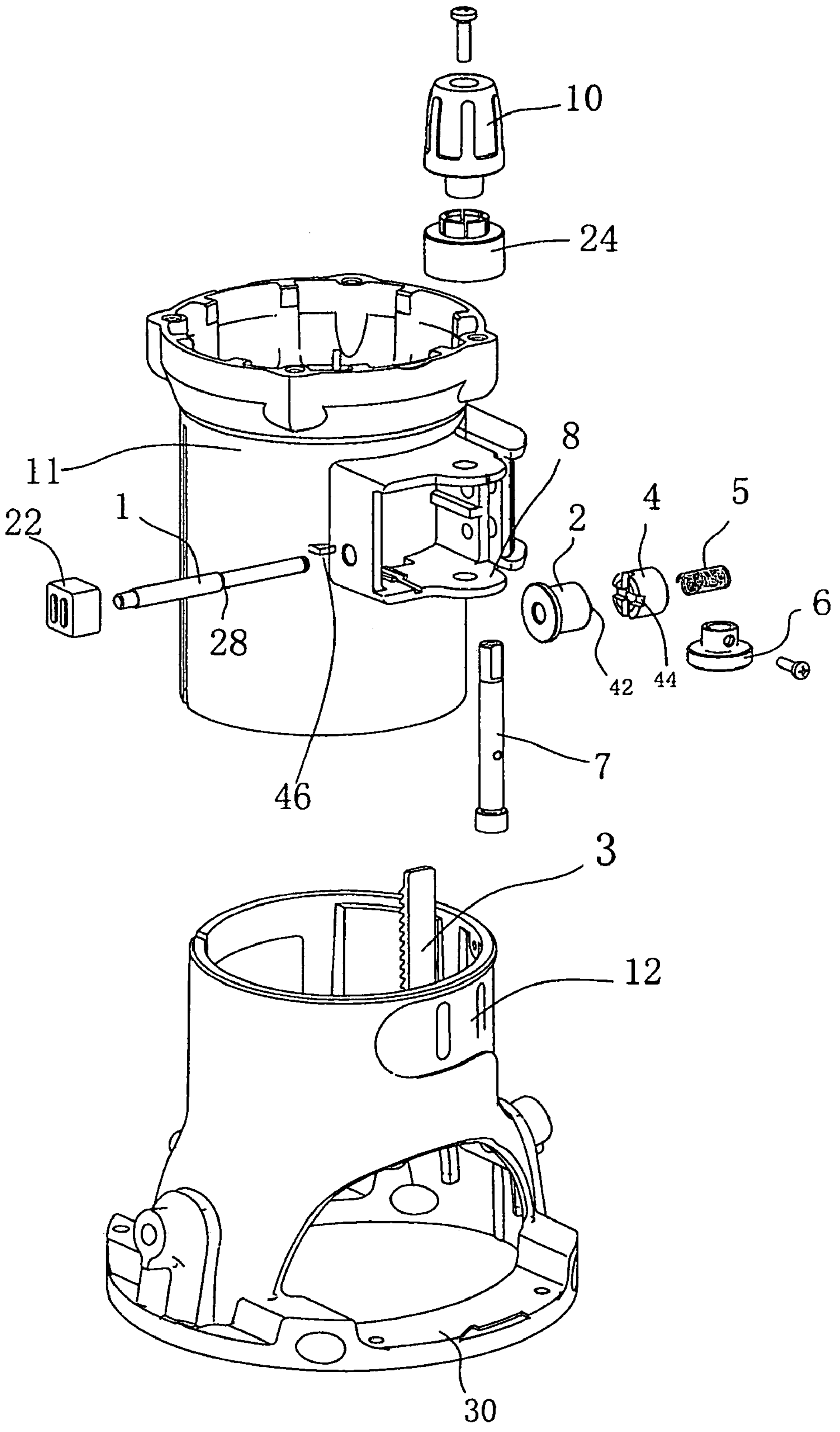
FIG.5 is a schematic illustration of an embodiment wherein the toothed bar 3 is mounted on the base assembly and the adjusting mechanism is mounted on the motor housing.

Referring to FIG. 3 and FIG. 4, the adjusting mechanism 100 is shown with details. A vertical toothed bar 3 is fixed on outside of the motor housing 11. The base member 12 includes a gear chamber 8 and the clamping handle 9 functions as a cover for the gear chamber 8. A horizontally, slidable gear shaft 1 and a vertical worm shaft 7 inserts into the gear chamber 8 respectively.

A step 28 is formed on the central portion of the gear shaft 1. A link gear 2 and a lock gear 4 are mounted on each side of the step 28 of the gear shaft 1 respectively. The link gear 2 is available to engage the toothed bar 3. Opposing faces of the link gear 2 and the lock gear 4 have detent means respectively. As an embodiment, the detent means are a plurality of teeth 42, 44 that are engagable with each other. The engagement of the face teeth 42, 44 circumferentially fixes the link gear 2 and the lock gear 4. One side of the lock gear 4 which is adjacent to the link gear 2 is axially restrained by the step 28 of the gear shaft 1. A spring 5 is biased between the other side of the lock gear 4 that is away from the link gear 2 and sidewall of the cavity 8. A press button 22 is mounted on an outside end of the slidable gear shaft 1. A slot (not shown) is formed on the press button 22 and is guided along a guide rib 46 formed on the base member 12, such that the gear shaft 1 is slidable relative to the base member 12 but is prevented from rotating.

A knob 10 and a scale ring 24 is mounted on top end of the worm shaft 7 and a worm 6 that is available to engage the lock gear 4 and which is fixed on a middle portion of the worm shaft 7. The lock gear 4 is available to be pushed by the step 28 of the gear shaft 1 to be axially slidable between a first position and a second position. When the lock gear 4 is biased by the spring 5 to the first position, the lock gear 4 engages the worm 6, and the teeth 44 of the lock gear 4 engage the teeth 42 of the link gear 2 such that the two gears are immovable relative to each other. Meanwhile, when the knob 10 is rotated by an operator, the lock gear 4 will be driven to rotate, and subsequently the link gear 2 is driven to rotate along with the lock gear 4 so as to move the toothed bar 3 vertically. Thus, the motor housing 11 is vertically moved relative to the base member 12 and precise adjustment is achieved. When the press button 22 is pressed such that the gear shaft 1 drives the lock gear 4 to the second position, the lock gear 4 disengages the link gear 2 and the two gears are free to rotate relative to each other. Then the operator can directly move the motor housing 11 to a desired position. During the adjustment, the clamping lever 9 should be opened as shown in FIG. 1 and FIG. 3. After the adjustment is completed, the clamping lever 9 can be closed to lock the motor housing 11 on the base member 12. In this manner, a tool is provided having a reasonable and compact structure to obtain a fast and precise cutting depth adjustment and which is also convenient for operating.

The description and the illustration of the drawings above is only for an exemplary, preferred embodiment of the present invention. The protection scope of the present invention is not to be limited by this disclosure but by the appended claims.

What is claimed is:

1. An electric power tool, comprising:

a base assembly;

a motor housing slidably mounted on the base assembly;

a motor and transmission mechanism contained in the motor housing connected to an output shaft on which a bit is to be fixed;

a vertical toothed bar mounted on one of the base assembly and the motor housing and a gear shaft horizontally mounted on the other of the base assembly and the motor housing;

a first gear rotatably mounted on the gear shaft and being engaged with the toothed bar;

a second gear mounted on the other of the base assembly and the motor housing and slidably movable between a first position and a second position; and a knob mounted on the other of the base assembly and the motor housing for operably rotating the second gear;

wherein, when the second gear is at the first position, the second gear directly engages the first gear and, when the second gear is at the second position, the second gear disengages the first gear.

2. The electric power tool as claimed in claim 1, comprising a third gear connected to the knob and wherein the second gear is rotatably mounted on the gear shaft, the first position and the second position are axially apart along the gear shaft, and, when the second gear is in the first position, the second gear engages the third gear and is not rotatable relative to the first gear.

3. The electric power tool as claimed in claim 2, comprising a stopper associated with the gear shaft and a spring for biasing the second gear towards the first position, wherein the gear shaft is axially slidable and the second gear is restrained axially by the stopper on the gear shaft.

4. The electric power tool as claimed in claim 3, wherein the stopper is a step between the first gear and the second gear.

5. The electric power tool as claimed in claim 3, comprising a press button having a slot mounted on an outside end of the gear shaft and a guide rib is formed on the other of the base assembly and the motor housing and cooperable with the slot.

6. The electric power tool as claimed in claim 2, comprising a worm shaft disposed perpendicular to the gear shaft wherein the third gear is a worm and the third gear and the knob are coaxially mounted on the worm shaft.

7. The electric power tool as claimed in claim 2, wherein opposing faces of the first gear and the second gear have detent means respectively that are engagable with each other and engagement of the detent means circumferentially fixes the first gear and the second gear.

8. The electric power tool as claimed in claim 7, wherein the detent means are plurality of teeth that are engagable with each other.

9. The electric power tool as claimed in claim 1, comprising a spring for biasing the second gear to the first position.

10. The electric power tool as claimed in claim 1, wherein a vertical opening slot is formed on the base assembly such that a section of the base assembly where the motor housing is mounted is "C" shaped and comprising a hinge shaft and a clamping lever having a first end hinged to one side of the opening slot by the hinge shaft with the first end of the clamping lever including a cam surface to change the gap of the opening slot and a second end of the clamping lever being lockable onto a corresponding structure formed on the other side of the opening slot of the base assembly.

11. The electric power tool as claimed in claim 10, wherein the first gear and the second gear are disposed in a gear chamber and the clamping lever covers the gear chamber.

* * * * *